Figure 1:
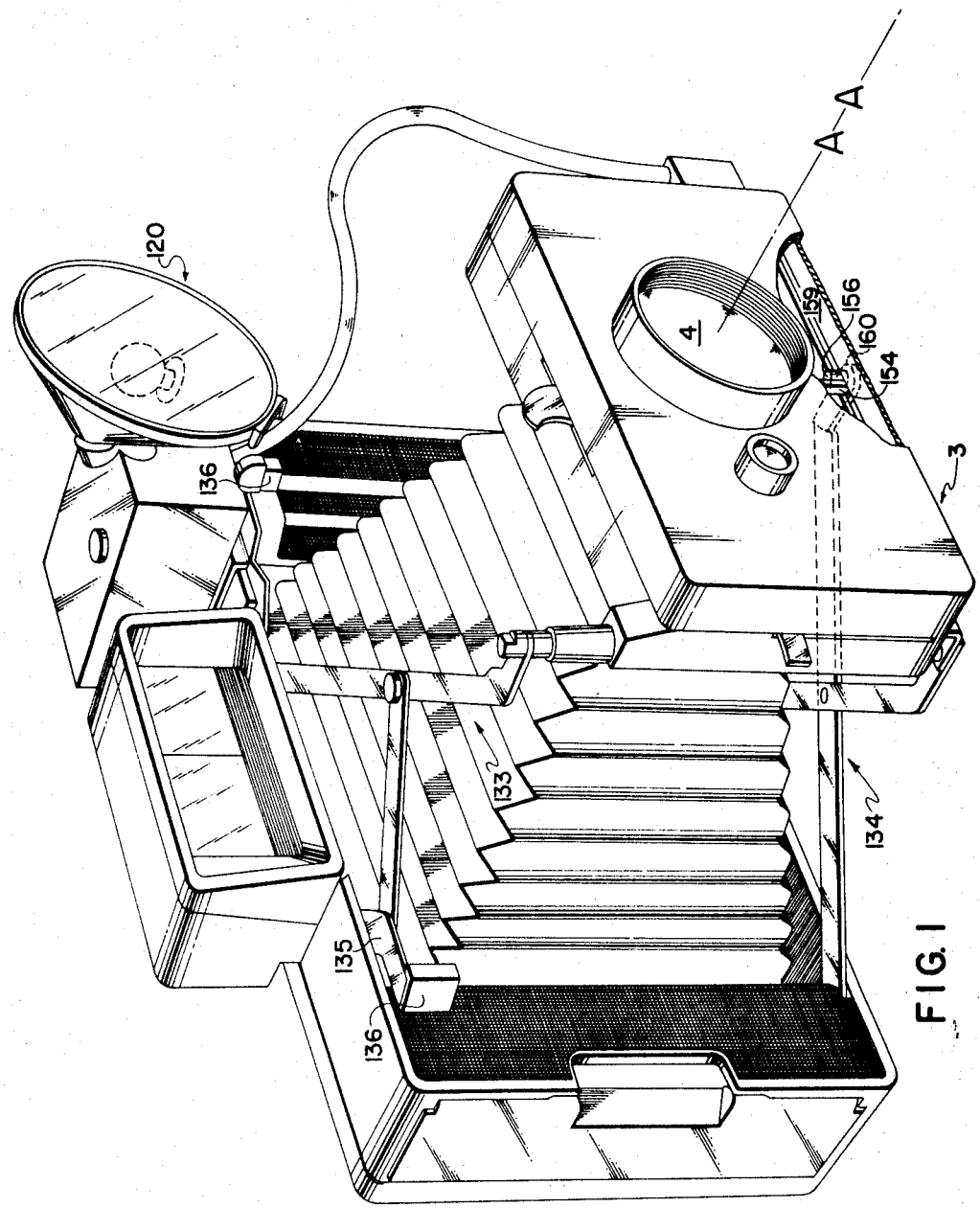

INVENTOR.
John P. Burgarella
BY Brown and Mikulka
and
John H. Coult
ATTORNEYS

United States Patent Office 3,433,138
Patented Mar. 18, 1969

3,433,138
SHUTTER CONTROL SYSTEM FOR PHOTOGRAPHIC APPARATUS
John P. Burgarella, Sudbury, Mass., assignor to Polaroid Corporation, Cambridge, Mass., a corporation of Delaware
Filed Sept. 29, 1966, Ser. No. 582,972
U.S. Cl. 95—10                                   7 Claims
Int. Cl. G01j 1/52

This invention relates to photographic apparatus including a shutter mechanism having a control member, the release of which member affects the amount of light passed by the shutter mechanism, and to a system in such apparatus for controlling the release of such a control member to effect a controlled exposure of a photosensitive film material in a wide range of levels of either flash or ambient illumination. The present invention is particularly concerned with the means in such a system for effecting release of such a shutter control member in photoflash applications.

One type of exposure control system which has been proposed comprises a variable diaphragm defining an effective exposure aperture which is altered gradually in response to movement of an actuator member. In ambient lighting conditions the actuator member is moved until the diaphragm defines an effective aperture which is appropriate for the speed of the associated shutter mechanism and the sensitivity of the film material employed and for the level of ambient illumination. The level of ambient illumination may be determined, for example, by photometric means. In such systems, at a particular setting of the diaphragm the actuator member may release a shutter mechanism to effect an exposure of the associated film material. This invention contemplates the provision of an improved shutter control system particularly useful in connection with exposure control systems of this general type.

It is an object of this invention to provide in photographic apparatus including shutter means having a releasable exposure control member, means for effecting release of the exposure control member in response to a drop in electrical potential across power supply means caused by the discharge of a luminous energy source connected across the power supply means.

It is another object of this invention to provide in photographic exposure control apparatus including diaphragm means variable in response to movement of an actuator member and a shutter mechanism including a releasable control member, the release of which affects the amount of light passed by the shutter mechanism, a shutter control system for effecting an automatic release of the shutter control member at an appropriate effective aperture in either ambient or flash lighting conditions.

It is a further object to provide such a shutter control system having means effecting release of the shutter control member only in ambient light levels above a predetermined minimum level necessary for a proper exposure and in flash lighting conditions only in response to the discharge of a luminous energy source operably connected in a flash circuit. It is another object that the release of the shutter control member in flash lighting conditions be coordinated with the camera-to-subject distance.

It is yet another object of this invention to provide in exposure control apparatus of the type described above, a shutter control system including novel means for automatically effecting release of such a shutter control member in photoflash operations which is extremely reliable and simple in structure and operation and which is inexpensive to produce. It is another object to provide such a shutter control system having fail-safe features preventing an exposure of the associated film material in ambient lighting conditions at light levels below a predetermined minimum level and in flash conditions when a source of luminous energy is either unconnected in the flash circuit or is defective.

Briefly, one structural implementation of the invention may comprise shutter means having a releasable exposure control member, the release of which affects the amount of light passed by the shutter means, electrical control means responsive to electrical potentials exceeding a predetermined level for retaining the exposure control member, flash connection means for energizing a luminous energy source, and electrical power supply means capable of supplying electrical potentials above said predetermined level across the control means and across the flash connection means, the power supply means having sufficient internal resistance that upon discharge of a luminous energy source through the flash connection means the potential applied by the power supply means to the control means drops below the aforesaid predetermined level to effect a release of the exposure control member.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

Figure 2:
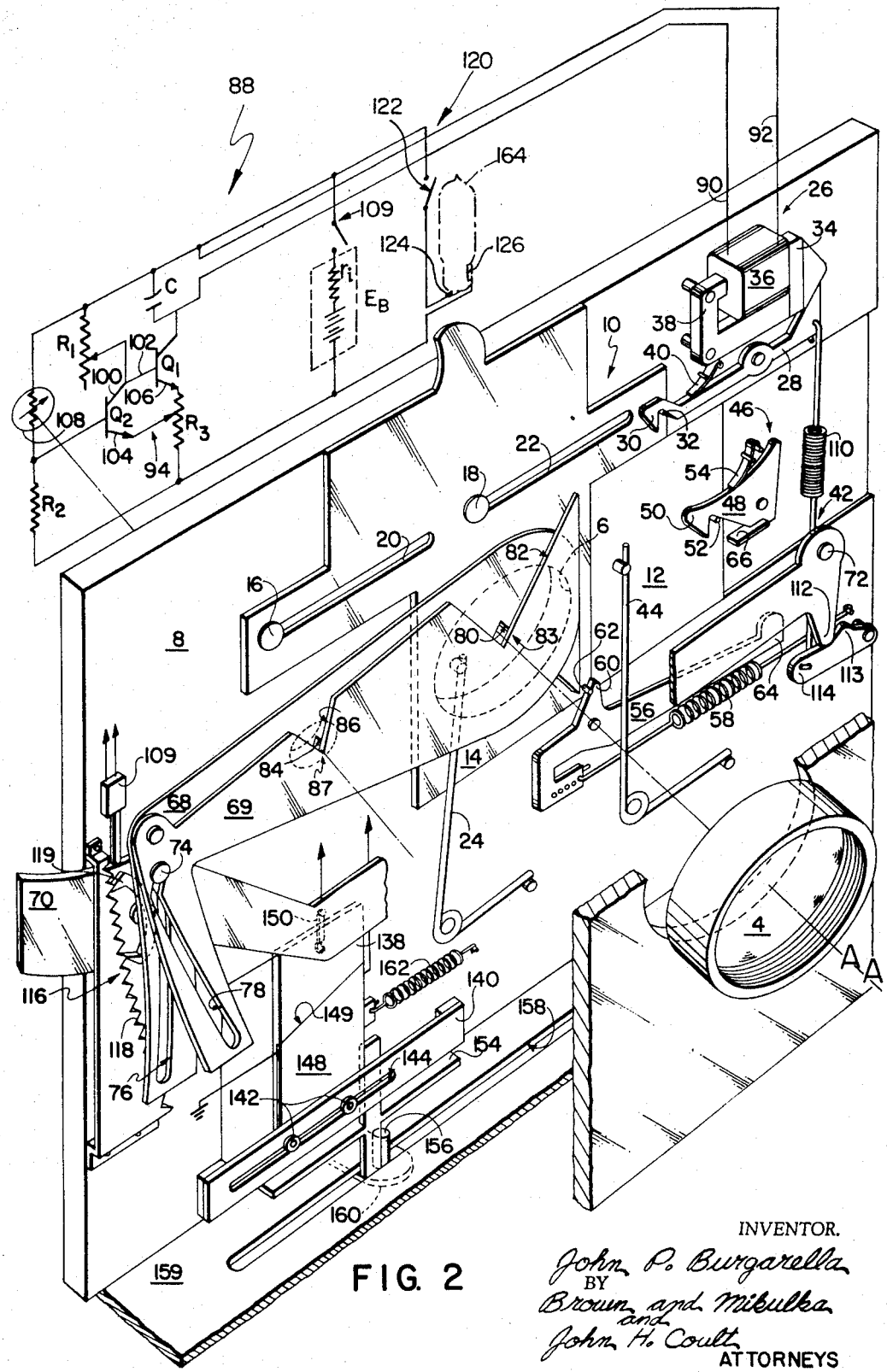

For a fuller understanding of the nature and objects of the invention, reference should be had to the following detailed description taken in connection with the accompanying drawings wherein:

FIGURE 1 is a perspective view of a photographic camera exemplifying a structure with which the invention may be practiced, a portion of the front assembly for the camera being broken away to show certain hidden elements; and FIG. 2 is a diagrammatic view of exposure control apparatus, revealed in part in FIGURE 1, which embodies the principles of the invention.

The drawings illustrate a preferred embodiment of the invention in a photographic camera including a front assembly 3. Referring particularly to FIG. 2, the front assembly 3 may contain an exposure control system including an objective lens 4 for focusing images of the scene to be photographed upon a photosensitive material (not shown) through an exposure aperture 6 in a base plate 8.

A fixed-speed shutter mechanism 10 mounted upon the base plate 8 is illustrated as comprising reciprocably mounted closing and opening blades 12, 14, respectively. The opening blade 14 is mounted to reciprocate on the base plate 8 by means of a pair of pins 16, 18, extending from the base plate 8 which are slideably received in a pair of slots 20, 22 in the opening blade 14. A hairpin-type spring 24 may be provided for urging the opening blade 14 from its light blocking position, as shown, to a light unblocking position away from the exposure aperture 6.

For the purpose of controlling the release of the opening blade 14 for movement thereof from a light blocking position to a light unblocking position, an electromagnetic shutter control device 26 is provided. The control device 26 comprises a latch lever 28 pivotally mounted upon base plate 8 and having a dog 30 on one end thereof adapted to engage a pin 32 projecting from the opening blade 14. A keeper 34 on the opposed end of the latch lever 28 is adapted for magnetic retention by an electromagnet comprising a coil 36 surrounding a high-permeance core 38. A leaf-type return spring 40 may be provided for biasing the latch lever 28 in a counterclockwise direction to return the latch lever 28 to a latching position after disengagement thereof from the pin 32.

The closing blade 12 is illustrated as being slideably mounted within a channel 42 in the base plate 8 for movement under the influence of a hairpin-type spring 44 from a light unblocking position, as shown, to a light blocking position wherein the closing blade 12 overlies the exposure aperture 6.

A latch assembly 46 is provided for retaining the closing blade 12 against the bias of spring 44. The latch assembly 46 may comprise a rotatably mounted arm 48 having a dog 50 for engaging a pin 52 projecting perpendicularly from the closing blade 12. A leaf-type return spring 54 may be provided for returning the arm 48 to its latching position after disengagement from the pin 52.

In order to interpose a predetermined time delay between the release of the opening blade 14 by the control device 26 and the subsequent release of the closing blade 12 by the latch assembly 46, an inertia arm 56 may be provided. When the opening blade 14 is in its blocking position, the inertia arm 56 is prevented from moving in a counterclockwise direction under the force of a spring 58 by the engagement of a radial extension 60 of the arm 56 with a pin 62 projecting transversely from the opening blade 14.

The shutter mechanism 10 is actuated by a de-energization of the control device 26 which causes the pin 32 on opening blade 14 to be disengaged from dog 30 on lever 28. The escape of the opening blade 14 from the control device 26 allows the inertia arm 56 to rotate counterclockwise under the influence of spring 58 until a head 64 on the inertia arm 56 strikes an anvil member on the arm 48, disengaging the dog 50 on arm 48 from the pin 52 on the closing blade 12. The closing blade 12 follows the opening blade 14 to provide a predetermined fixed exposure interval.

In order to effect a release of the opening blade 14 by the control device 26 at an effective exposure aperture according with the scene brightness and the shutter speed and photosensitive material used, control means are provided. The control means may include a pair of cooperating, pivotally mounted diaphragm blades 68, 69 movable relative to each other by means of a manually operable control member 70. The control member 70 (shown broken away between its two ends for clarity) is pivotally mounted on the base plate 8 by means of pin 72 and includes a camming member 74 received in slots 76, 78 in the diaphragm blades 68, 69, respectively, for effecting a displacement of the blades 68, 69 with respect to each other.

The diaphragm blades 68, 69 include a first mating pair of contours 80, 82, registered with the exposure aperture 6 for defining an aperture 83 constituting the effective exposure aperture for exposing a photosensitive material associated with the described apparatus. A second set of cooperating contours 84, 86, in the blades 68, 69 define another aperture 87 for controlling the light admitted to an element of the shutter control means to be described hereinafter.

The shutter control means further includes a control circuit 88 for controlling the energization of the coil 36 comprising part of the shutter control device 26. The coil 36 in the control device 26 is connected by means of a pair of leads 90, 92 in the control circuit 88 in series with transistorized switching means 94 and in parallel with a power supply $E_B$. The switching means 94 in the illustrated embodiment of the invention comprises first and second transistors $Q_1$, $Q_2$. The transistor $Q_2$ has its collector electrode 100 connected to the base electrode 102 of transistor $Q_1$ and its emitter electrode 104 tapping a variable resistor $R_3$ connected to the emitter electrode 106 of transistor $Q_1$. Thus the bias current fed to transistor $Q_1$ through adjustable resistor $R_1$, and thus the conduction of transistor $Q_1$, is controlled by the state of conduction of transistor $Q_2$.

The switching means 94, and more directly the transistor $Q_2$ is rendered responsive to the level of scene brightness, receiving its base bias current from a voltage divider comprising a resistor $R_2$ and a photocell 108, or other suitable photoresponsive device, exposed to the scene to be photographed through the aperture 87 in the diaphragm blades 68, 69. The connection of the emitter electrode 104 of transistor $Q_2$ to resistor $R_3$ places $R_3$ as a common resistance in the $Q_1$ and $Q_2$ emitter circuits, establishing a feedback from transistor $Q_1$ to transistor $Q_2$ which provides a very rapid switching of the conduction from $Q_1$ to $Q_2$ when the base current supplied through the photocell 108 to the base electrode of transistor $Q_2$ reaches a level sufficiently great to bias the transistor $Q_2$ into conduction.

As the control member 70 is manually depressed prior to exposure, the diaphragm blades 68, 69 are moved relative to each other to effect a gradual enlargement of the exposure aperture 83 and also of the photocell aperture 87. A main switch 109 for operably connecting power supply $E_B$ into the control circuit 88 is closed at the initiation of the downstroke of control member 70. When the exposure aperture 83 is appropriate for the scene brightness, for the speed of the shutter mechanism, and for the photosensitive material used, taking into account the various parameters in the exposure control system, the transistor $Q_2$ is triggered into conduction, effecting a rapid switching of transistor $Q_1$ to a nonconducting state. At this instant, the coil 36 is deenergized. Any high current surges which may be caused by induction in the coil 36 are shunted by a capacitor C connected in parallel with the coil 36.

Deenergization of the coil 36 produces a rapid demagnetization of the core 38, allowing a spring 110, which is tensioned during the downstroke of control member 70 by the engagement of a camming lobe 112 on the control member 70 with a cam follower lobe 113 on a pivoted arm 114, to draw the latch lever 28 clockwise to free the opening blade 14. As the opening blade 14 moves to its light unblocking position, the inertia arm 56 rotates under the influence of spring 58 into engagement with the anvil member 66 on the latch assembly 46, freeing the closing shutter blade 12 for movement to its light blocking position.

In order that the speed at which the control member 70 is depressed may be rendered relatively invariant, so that variations in depression speed may be substantially eliminated as a factor in determining the effective exposure aperture at which the shutter mechanism 10 is actuated, an escapement mechanism 116 may be provided. The escapement mechanism 116 may include an arcuate escapement rack 118 mounted on the base plate 8 and a pallet 119 pivotally mounted on the control member 70 for oscillatory engagement along the rack 118 upon depression of the control member 70. The escapement mechanism 116 acts to minimez the effect of manual pressure on the control member 70 as a factor in determining the speed at which the control member 70 may be depressed and thus stabilizes the depression speed at a speed relatively independent of the depression force applied.

By a proper selection of the photocell 108 and the value of the resistance $R_2$ and the other parameters in the system, the condition may be established that at levels of scene brightness which are below a predetermined minimum level necessary for a satisfactory exposure of the photosensitive materials employed, insufficient bias current will be fed to transistor $Q_2$, even at the maximum effective exposure aperture, to trip the shutter mechanism 10. With such a condition established, it becomes impossible to underexpose the photosensitive material used because of insufficient ambient light. Thus, a depression of the control member 70 without the actuation of the shutter mechanism 10 indicates to the operator that insufficient ambient light is available and that a source of artificial illumination, such as a flash bulb, must be used in order to obtain a satisfactory exposure.

By this invention a flash circuit 120 is connected in parallel with the power supply $E_B$ and also in parallel with the coil 36 such that completion of the flash circuit 120 is effective to trip the shutter mechanism, as described below. The flash circuit 120 may comprise a flash switch 122 in series with flash connection meane which may constitute a pair of terminals 124, 126 and the necessary leads thereto.

It is desirable in flash photography that the effective aperture at which a flash exposure is made be varied directly with subject distance. By an invention of E. H. Land, described and claimed in copending patent application Ser. No. 582,973, filed Sept. 29, 1966, assigned to the assignee of the present invention, means are provided for effecting a closing of the flash switch 122 to produce a flash exposure at a setting of the diaphragm blades 68, 69 which defines an effective aperture dependent upon the range of the subject to be photographed.

To this end the diaphragm blades 68, 69 may be rendered responsive to visually estimated subject distances. In a preferred arrangement, however, the blades 68, 69 may be coupled directly to focusing means for the camera's objective lens 4.

In the illustrated embodiment of the invention, focusing means are provided, comprising articulated upper and lower focusing linkages 133, 134, respectively, coupled to the front assembly 3 of the camera, and a focusing bar 135 manually translatable by means of a pair of opposed push buttons 136 thereon. With the illustrated focusing apparatus, translation of the focusing bar 135 causes the linkages 133, 134 to translate the front assembly 3, and thus the objective lens 4, along the optical axis A—A.

In a shutter control system of the type depicted wherein a control member 70 for actuating the shutter mechanism 10 is coupled to aperture control means, it is desirable in flash applications that a flash exposure be initiated at a point in the locus of travel of the control member 70 which establishes an effective aperture appropriate for the focused subject distance.

To accomplish these ends, by the above-identified invention of E. H. Land, switch actuating means may be provided which are rendered responsive to the control member 70 (and thus to the effective exposure aperture) and to the focusing means for effecting a closure of the flash switch 122 at an effective aperture appropriate for the focused distance of the objective lens 4, as described below.

Referring now especially to FIG. 2, the switch actuating means may comprise a switching member 138 reciprocably mounted upon a mounting strip 140 by means of pins 142 slideably received in a slot 144 in the strip 140. The switching member 138 may have an electrically conductive insert 148 thereon, which insert 148 is provided with an upper edge 149 angled obliquely relative to the locus of travel of the control member 70.

Although numerous arrangements may be provided for effecting actuation of the flash switch 122 in the illustrated preferred arrangement, a wiper-type contact 150 may be mounted upon and insulated from member 70, being positioned so as to engage the electrically conduction insert 148 on the switching member 138 when the control member 70 is depressed. It is evident that the point in the locus of travel of the control member 70 at which the electrically conductive insert 148 engages contact 150, is dependent upon the position of the switching member 138 relative to the locus of travel of contact 150. When the switching member 138 is located, for example, at the left end (in FIG. 2) of the slot 144 in strip 140, the contact 150 engages the insert 148 at a point in the locus of travel of the control member 70 corresponding to a smaller effective exposure aperture than when the switching member 138 is disposed at the right end of the slot 144.

Means are provided for altering the position of the switching member 138 in accordance with changes in the focused distance. Such means may take the form shown in FIG. 2, comprising a slideable coupling member 154 acted upon by a pin 156 projecting upwardly through a slot 158 in a bottom wall 159 of the front assembly housing from a linkage arm 160 comprising part of the lower focusing linkage 134. A spring 162 may be provided for maintaining the coupling member 154 in engagement with the pin 156 at all times during a focusing operation.

It is evident from the drawings and the above description that focus adjustments in the position of objective lens 4 by the focusing means causes the switching member 138 to be displaced by the pin 156 on linkage arm 160. By a proper selection of the relevant parameters in the apparatus, the condition may be readily established by one skilled in the art wherein the flash switch 122 is closed at an effective exposure aperture dependent upon the particular focused distance.

The concept on this invention utilizes the fact that the voltage output of a power supply $E_B$ such as a dry cell battery, as would preferably be used in the illustrated embodiment, varies inversely with the current output due to the inherent internal resistance $r_i$ thereof. With properly selected parameters in the switching means 94 and the other elements of the control circuit 88, the surge of current from the power supply $E_B$ upon ignition of a flash bulb 164 (shown in ghost lines in FIG. 2), due to the great decrease in the total effective resistance loading the power supply $E_B$, causes the voltage applied across the coil 36 to drop below a predetermined minimum level necessary to produce the minimum magnetic flux required to retain the keeper 34. As described above, release of the keeper 34 initiates the actuation of the shutter mechanism 10.

If the inherent internal resistance $r_i$ of the power supply $E_B$ selected is very low, it may be necessary to add a very small resistance in the flash circuit in series with the power supply $E_B$.

Thus, by this invention, actuation of the shutter mechanism 10 in flash applications is effected as described above by the discharge of a flash bulb or other source of luminous energy connected in parallel across the power supply $E_B$ and across the coil 36 of the electrical shutter control device 26.

It is evident that by this invention a shutter control system has been provided having fail-safe features which act to prevent actuation of the shutter mechanism 10, and thus exposure of the associated photosensitive material, in ambient light when the existing ambient light level is below a predetermined minimum level necessary for an aesthetically satisfactory exposure, and which also act in photoflash applications to prevent actuation of the shutter mechanism except when a pulse of luminous energy is actually generated by the source used. A spent or defective luminous energy source or a poor connection between the source and the flash terminals 124, 126, or any other defect or break in the flash circuit which might prevent operation of the luminous energy source precludes actuation of the shutter mechanism 10 and thus the underexposure of the associated photosensitive material.

Certain changes may be made in the present structure without departing from the scope of the invention herein involved. For example, rather than utilizing a fixed speed shutter, an electrically actuated control device, for example of the type shown at 26, might be utilized to control the closing blade of a variable speed shutter. Other types of shutter mechanisms and electrically actuated control devices may be employed. One skilled in the art may readily devise other photoresponsive means for controlling the release of a shutter mechanism in ambient lighting conditions. Many other changes may be made in the above apparatus without departing from the scope of the invention herein involved. It is therefore intended that all matter contained in the above description or shown in the accompanying drawings shall be interpreted as illustrative and not in a limiting sense.

What is claimed is:

1. In photographic apparatus including an exposure aperture for exposing photosensitive material in the apparatus, the combination comprising:

shutter means including at least one exposure control member movable from an initial position to a final position to control the amount of light admitted by the exposure aperture during exposure;

means for urging said exposure control member toward said final position;

electrical control means responsive to electrical potentials exceeding a predetermined level for retaining said exposure control member in said initial position;

flash connection means for energizing a luminous energy source; and electrical power supply means for supplying electrical potentials exceeding said predetermined level across said control means and across said flash connection means, said power supply means having sufficient resistance that upon energization of said luminous energy source the potential applied to said control means drops below said predetermined level to effect a release of said exposure control member.

2. The apparatus defined by claim 1 wherein said control means includes an electromagnet for retaining a high-permeance portion of said exposure control member.

3. The apparatus defined by claim 1 including:

photoresponsive means exposed to scene light and having an electrical parameter which varies in accordance with the intensity of scene light incident thereon;

variable diaphragm means registered with said exposure aperture for defining a range of effective exposure apertures;

light control means coordinated with said diaphragm means for varying the amount of scene light admitted to said photoresponsive means in correspondence with the amount of scene light passed by said diaphragm means; and switching means in series with said control means, said switching means being responsive to said electrical parameter of said photoresponsive means for de-energizing said control means and thereby effecting release of said shutter control member when said photoresponsive means achieves a predetermined resistance value corresponding to the definition by said diaphragm means of an effective aperture appropriate for the scene brightness and the photosensitive material employed.

4. The apparatus defined by claim 3 wherein said control means includes latch means for engaging said shutter control member and wherein said control device comprises an electromagnet for magnetically retaining a high-permeance portion of said latch means.

5. The apparatus define by claim 3 wherein said switching means includes means for precluding deenergization of said control means and therefore actuation of said shutter means at levels of ambient illumination below a predetermined minimum level necessary for a proper exposure, discharge of a luminous energy source through said flash connection means overriding said switching means for releasing said control member to actuate said shutter means at ambient levels of illumination below said predetermined minimum level, whereby attempts to actuate said shutter means are effective at levels of ambient illumination below said predetermined minimum level only if a discharge of a source of flash illumination is produced through said flash connection means.

6. The apparatus defined by claim 5 wherein said switching means comprises a trigger circuit including a first normally conducting transistor having a base electrode and having collector and emitter electrodes connected in series with said control device, and a second normally non-conducting transistor receiving base bias current from a voltage dividing bias circuit including said photoresponsive means, said second transistor having collector and emitter electrodes connected across said base and emitter electrodes of said first transistor, said second transistor being biased into conduction to trip said shutter means when said resistance of said photoconductive element achieves said predetermined value.

7. A photographic exposure control system for a photographic camera having an exposure aperture for exposing a photosensitive material comprising:

manually actuated means for progressively varying the effective area of the exposure aperture;

switch means for completing a flash lamp-energizing circuit to illuminate the scene to be photographed;

means for closing said switching means at a particular effective area of the exposure aperture dependent on the camera-to-subject distance; and shutter means released to control the exposure through said exposure aperture in response to currents caused to flow in said switch means when closed.

References Cited

UNITED STATES PATENTS

| 2,978,970 | 4/1961 | Fahlenberg | 95—11.5 |
| 3,063,354 | 11/1962 | Matulik et al. | 95—53 XR |
| 3,205,802 | 9/1965 | Wareham | 95—11.5 |

NORTON ANSHER, *Primary Examiner.*

J. F. PETERS, Jr., *Assistant Examiner.*

U.S. Cl. X.R.

95—11.5, 53; 343—783, 911